US009638551B2

(12) United States Patent
Ookura

(10) Patent No.: US 9,638,551 B2
(45) Date of Patent: May 2, 2017

(54) POINTING DEVICE AND METER APPARATUS PROVIDED WITH THE SAME

(71) Applicant: Yazaki Corporation, Tokyo (JP)

(72) Inventor: Kenji Ookura, Shimada (JP)

(73) Assignee: Yazaki Corporation, Tokyo (JP)

( * ) Notice: Subject to any disclaimer, the term of this patent is extended or adjusted under 35 U.S.C. 154(b) by 710 days.

(21) Appl. No.: 14/056,042

(22) Filed: Oct. 17, 2013

(65) Prior Publication Data

US 2014/0033965 A1 Feb. 6, 2014

Related U.S. Application Data

(63) Continuation of application No. PCT/JP2012/061803, filed on Apr. 27, 2012.

(30) Foreign Application Priority Data

Apr. 28, 2011 (JP) ................................ 2011-101733

(51) Int. Cl.
*G01D 7/00* (2006.01)
*G01D 11/28* (2006.01)
*G01D 13/26* (2006.01)

(52) U.S. Cl.
CPC ............... *G01D 7/00* (2013.01); *G01D 11/28* (2013.01); *G01D 13/265* (2013.01)

(58) Field of Classification Search
CPC ........ G01D 13/265; G01D 7/00; G01D 11/28; E01F 9/646; E01F 9/685; G01C 15/04
USPC .................... 116/DIG. 36, 286–288, DIG. 6; 362/23.18–23.2
See application file for complete search history.

(56) References Cited

U.S. PATENT DOCUMENTS 4,860,170 A 8/1989 Sakakibara et al.
5,142,456 A * 8/1992 Murphy ................ G01D 11/28 116/288

(Continued)

FOREIGN PATENT DOCUMENTS

CN 201272253 Y 7/2009
CN 102001310 A 4/2011

(Continued)

OTHER PUBLICATIONS

Communication from the State Intellectual Property Office of P.R. China dated Mar. 30, 2015 in a counterpart application No. 201280019600.1.

(Continued)

*Primary Examiner* — Laura Martin
*Assistant Examiner* — Irving A Campbell
(74) *Attorney, Agent, or Firm* — Sughrue Mion, PLLC

(57) ABSTRACT

A pointing device includes a pointer having light guiding properties, a cap that is attached to the pointer and has light blocking properties, a pointing shaft that is vertically formed on a proximal end portion of the pointer, and a light blocking member. The light blocking member includes a cylindrical main body having both end portions for inserting the pointing shaft and a rotary shaft of a motor having light guiding properties respectively thereinto to prevent illuminating light propagating through the rotary shaft from a light source and entering the pointing shaft from leaking from an outer peripheral surface of the pointing shaft.

9 Claims, 11 Drawing Sheets

(56) References Cited

U.S. PATENT DOCUMENTS

| | | | | |
|---|---|---|---|---|
| 7,665,413 | B2 * | 2/2010 | Birman | G01D 11/28 116/288 |
| 2009/0038535 | A1 | 2/2009 | Morales et al. | |
| 2011/0114009 | A1 | 5/2011 | Fukuda et al. | |

FOREIGN PATENT DOCUMENTS

| | | | | | |
|---|---|---|---|---|---|
| DE | 3425029 | A1 | | 1/1985 | |
| EP | 2 306 159 | A1 | | 4/2011 | |
| JP | 3-125217 | U | | 12/1991 | |
| JP | H0612995 | U | * | 2/1994 | G01D 11/28 |
| JP | 2004-125413 | A | | 4/2004 | |
| JP | 2005-156454 | A | | 6/2005 | |
| JP | 2009-002722 | A | | 1/2009 | |
| JP | 2009-281926 | A | | 12/2009 | |
| WO | 2008/063633 | A2 | | 5/2008 | |

OTHER PUBLICATIONS

Office Action dated Oct. 27, 2015, issued by the State Intellectual Property Office of P.R. China in counterpart Chinese Application No. 201280019600.1.

Office Action dated Jan. 6, 2015 issued by the Japanese Patent Office in counterpart Japanese Patent Application No. 2011-101733.

Office Action, Issued by the National Institute of Industrial Property National Patent Administration, Dated Jul. 14, 2014, in counterpart Argentine Application No. P120101503.

International Search Report (PCT/ISA/210), dated Dec. 4, 2012, issued by the International Searching Authority in counterpart International Patent Application No. PCT/JP2012/061803.

Written Opinion (PCT/ISA/237), dated Dec. 4, 2012, issued by the International Searching Authority in counterpart International Patent Application No. PCT/JP2012/061803.

* cited by examiner 1
2A
C
91
9
92
8C
8B
9A
D
S
10A
45
8
61
71
7
8A
3
8D
41
B
6C
6A
62
6
71
6B
51
52C
52D
52A
53
52
5
51
52B
P1
D
4B
4A
4
X
Z
Y Prior Art

POINTING DEVICE AND METER APPARATUS PROVIDED WITH THE SAME

CROSS REFERENCE TO RELATED APPLICATIONS

This application is a continuation of PCT application No. PCT/JP2012/061803, which was filed on Apr. 27, 2012 based on Japanese Patent Application (No. P2011-101733) filed on Apr. 28, 2011, the contents of which are incorporated herein by reference.

BACKGROUND OF THE INVENTION

1. Field of the Invention

The present invention relates to a pointing device including a pointer (pointing needle) for indicating numeric characters etc. of a character plate of instruments and the like, and a meter apparatus provided with the pointing device.

2. Description of the Related Art

This kind of meter apparatus mounted in a vehicle etc. is generally constructed so as to illuminate a character plate provided with characters, numeric characters, a scale, etc. or illuminate a pointer for indicating the characters, the numeric characters, etc. of the character plate from the back side by a dedicated light source etc. As such a meter apparatus, for example, apparatuses described in JP-A-2004-125413 and WO/2008/063633 are known.

As shown in FIG. 11, a meter apparatus 100 described in JP-A-2004-125413 is configured to include a driving device 102 formed with a rotary shaft 101 extending forward, a display plate 105 which is arranged in the front of this driving device 102 and has a shaft hole 104 corresponding to the rotary shaft 101, a pointer 106 which is joined to the rotary shaft 101 through a joint 108 and a cylindrical pointing shaft 107 formed of a transparent material and rotates and moves on the display plate 105, a light source 111 which is arranged in the rear of the pointer 106 and illuminates the pointer 106, and a cap 109 for preventing light from the light source 111 from leaking to the outside, for example, the upper direction of the pointer 106.

According to this meter apparatus 100, distortion of an insertion hole 108A of the joint 108 can be suppressed while miniaturizing the light guide portion of the pointer 106. That is, the joint 108 is separately molded of other synthetic resin material and that material is provided with the insertion hole 108A, and this prevents a situation in which distortion due to a sink occurs in a thick-wall shaft part 110 with a large diameter constructing the pointing shaft 107 and the joint 108 and this distortion adversely affects press-in coupling to the rotary shaft 101.

However, in the pointer 106 of this meter apparatus 100, even when light from the light source 111 after the light enters the pointing shaft 107 is prevented from leaking to the outside by the cap 109, a part of the light may leak from a gap 103 between the cap 109 and the display plate 105 in the lower side of the cap 109 to the outside, that is, halation may be caused. When this halation is weak light, the halation is not very noticeable to a visual recognition person, but for intense halation, the halation is unpleasant for the visual recognition person and also strikes the visual recognition person as a reduction in quality of the meter apparatus.

Also, in a meter apparatus 200 described in WO/2008/063633, in addition to a cap 202 attached to a proximal part of a pointer 201 so as to cover the proximal part, an output shaft 204 of a motor 203 is provided with a sleeve 205 having a ring 205A formed of an opaque material as shown in FIG. 12.

In this meter apparatus 200, light from a light source 207 mounted in a substrate 206 is prevented from leaking from the sleeve 205 of the proximal part of the pointer 201 externally fitted into the output shaft 204 of the motor 203 to the outside to cause halation. However, such a meter apparatus still has a small gap between a display plate 208 and the ring 205A, so that a leak of light causing the halation cannot be prevented well.

SUMMARY OF THE INVENTION

Incidentally, in the meter apparatus described in JP-A-2004-125413 and WO/2008/063633, a shape of the pointer is limited to a certain shape, so that flexibility of design in the case of manufacturing the pointer is decreased accordingly.

The invention has been implemented in view of the circumstances described above, and an object of the invention is to provide a pointing device constructed so that in a type of pointing device in which a rotary shaft of a motor forms a light guiding member for guiding light to a pointer, a leak of light causing halation can be prevented and also a cap can be miniaturized and a shape of the pointer is not limited to a certain shape, and a meter apparatus provided with the pointing device.

In order to achieve the object described above, a pointing device according to the invention is characterized by the following (1) to (7).

(1) A pointing device, comprising:
- a pointer having light guiding properties;
- a cap that is attached to the pointer and has light blocking properties;
- a pointing shaft that is vertically formed on a proximal end portion of the pointer; and
- a light blocking member that includes a cylindrical main body having both end portions for inserting the pointing shaft and a rotary shaft of a motor having light guiding properties respectively thereinto to prevent illuminating light propagating through the rotary shaft from a light source and entering the pointing shaft from leaking from an outer peripheral surface of the pointing shaft.

(2) The pointing device according to the configuration of (1) described above, wherein the light blocking member includes a flange portion which is extended from the main body and covers a bottom surface of the proximal end portion of the pointer, the bottom surface of the proximal end portion being positioned inside the cap.

(3) The pointing device according to the configuration of (2) described above, wherein the proximal end portion of the pointer has as an outer peripheral surface, the bottom surface, a roof surface, a deflection surface positioned in a rear surface of the pointer, a side wall surface vertically erected from the bottom surface in a side surface of the pointer, and an erect surface vertically erected from the bottom surface in the rear surface of the pointer; and
- wherein the flange portion of the light blocking member is extended from the main body and covers a part of the bottom surface of the outer peripheral surface of the proximal end portion of the pointer.

(4) The pointing device according to the configuration of (3) described above, wherein the flange portion of the light blocking member is extended from the main body and further covers a part of the side wall surface or the erect surface of the outer peripheral surface of the proximal end portion of the pointer.

(5) The pointing device according to the configuration of (3) described above, wherein the flange portion of the light blocking member is extended from the main body and further covers whole of the elect surface and the side wall surface of the outer peripheral surface of the proximal end portion of the pointer.

(6) The pointing device according to any one of the configurations of (1) to (5) described above, wherein in the proximal end portion of the pointer, a void having a substantially inverted triangular shape or a substantially sectoral shape in cross section is formed along a width direction orthogonal to a longitudinal direction of the pointer so as to pass through above the pointing shaft.

(7) A pointing device, comprising:
- a pointer having light guiding properties;
- a cap that is attached to the pointer and has light blocking properties; and
- a light blocking member that includes a cylindrical main body having one open end portion fixed to a bottom surface of a proximal end portion of the pointer and the other open end portion for inserting a rotary shaft of a motor having light guiding properties thereinto to prevent illuminating light propagating through the rotary shaft from a light source from leaking to the outside while the illuminating light enters the bottom surface of the proximal end portion of the pointer.

According to the pointing device described in (1), the light blocking member for preventing the illuminating light propagating through the rotary shaft of the motor from the light source and entering the pointing shaft from leaking from the outer peripheral surface is provided, so that a leak of light causing halation can be prevented. Also, this light blocking member is installed so as to cover the whole outer periphery of the pointing shaft simultaneously, so that it is unnecessary to take the trouble to form a cap with a long skirt and prevent the illuminating light from leaking from the lower portion of the cap. That is, the cap can be miniaturized. Further, the pointing device capable of preventing occurrence of the halation without being limited to a certain shape in which a width of the proximal end portion is narrowed like a related pointer can be implemented.

According to the pointing device described in (2), the illuminating light after passing through the pointing shaft can be prevented from leaking from the bottom surface of the periphery of the pointing shaft of the pointer since a lower surface of the proximal end portion of the pointer inside the cap is also covered with the light blocking member.

According to the pointing device described in (3), the illuminating light after passing through the pointing shaft can be prevented from leaking from the bottom surface of the periphery of the pointing shaft of the pointer since the lower surface of the proximal end portion of the pointer inside the cap is also covered with the light blocking member.

According to the pointing device described in (4), it is constructed so as to more widely cover the outer peripheral surface of the proximal end side of the pointer and the pointing shaft with the light blocking member, and the illuminating light from the light source can further be prevented from leaking. As a result, occurrence of halation due to a light leak from these portions can be avoided, so that it becomes unnecessary to form the cap.

According to the pointing device described in (5), the rear surface of the pointer is also covered with the light blocking member, so that the illuminating light can also be inhibited from leaking from its rear surface. Therefore, even though the cap is not formed, the illuminating light can more effectively be prevented from leaking and thus, halation can more effectively be prevented from occurring.

According to the pointing device described in (6), most of the illuminating light traveling just over the pointing shaft of the inside of the pointer is reflected laterally or downwardly by the void since the void is formed over the whole width direction of the pointer. As a result, even though the cap is not formed, trouble in which the illuminating light passes through the upper portion of the pointer to the outside and directly enters eyes of a visual recognition person can be avoided.

According to the pointing device described in (7), it is unnecessary to insert the pointing shaft into the light blocking member, so that, for example, it becomes unnecessary to design and manufacture an outside diameter of the pointing shaft according to an inside diameter of the light blocking member.

In order to achieve the object described above, a meter apparatus according to the invention is characterized by the following (8).

(8) A meter apparatus, comprising:
- a rotary shaft having light guiding properties,
- a light source that is provided on a substrate on which a motor case is mounted, and emits light for illuminating a pointer through the rotary shaft, wherein the rotary shaft is contained in the motor case; and
- a pointing device according to any one of the configurations of (1) to (7),
- wherein the rotary shaft is assembled to the pointing device by inserting a distal end of the rotary shaft into the cylindrical main body of the light blocking member of the pointing device.

According to the meter apparatus described in (8), the pointing device described in any one of (1) to (7) described above is provided, so that the meter apparatus having any effects described above can be implemented.

The pointing device of the invention can prevent the leak of light causing halation since the light blocking member for preventing the illuminating light propagating through the rotary shaft of the motor from the light source and entering the pointing shaft from leaking from the outer peripheral surface is included in a type of device in which the rotary shaft of the motor forms means for guiding light to the pointer. Also, this light blocking member is installed so as to cover the whole outer periphery of the pointing shaft simultaneously, so that it is unnecessary to form the cap with the long skirt and prevent the illuminating light from leaking from the lower portion of the cap. That is, the cap can be miniaturized. Further, there is an advantage capable of implementing the pointing device capable of preventing occurrence of the halation without being limited to a certain shape in which the width of the proximal end is narrowed like the related pointer.

The invention has been described above briefly. Further, the details of the invention will become more apparent by reading through a mode for carrying out the invention described below with reference to the accompanying drawings.

DETAILED DESCRIPTION OF THE EXEMPLARY EMBODIMENTS

Embodiments of the invention will hereinafter be described in detail with reference to the accompanying drawings.

First Embodiment

Figure 1:
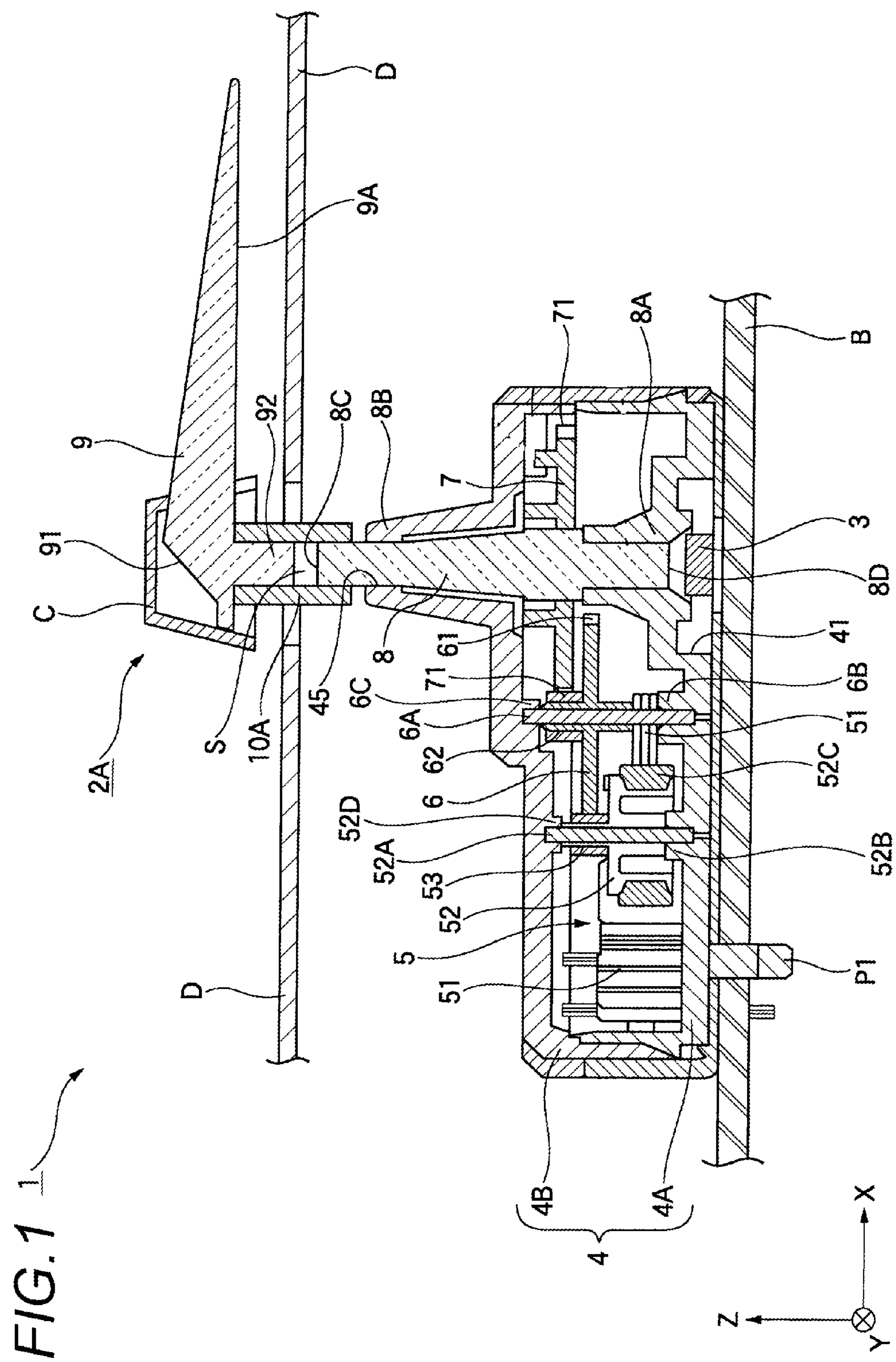
FIG. 1 is a sectional view showing a meter apparatus to which a pointing device according to a first embodiment of the invention is applied.
Figure 2A:
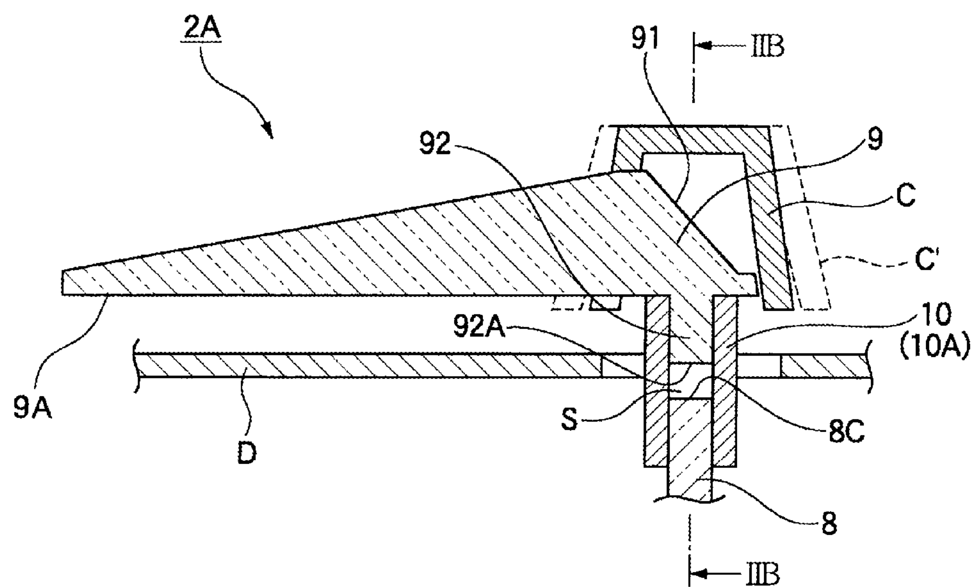
FIG. 2A is a sectional view showing the pointing device which is a main part of the meter apparatus.
Figure 2B:
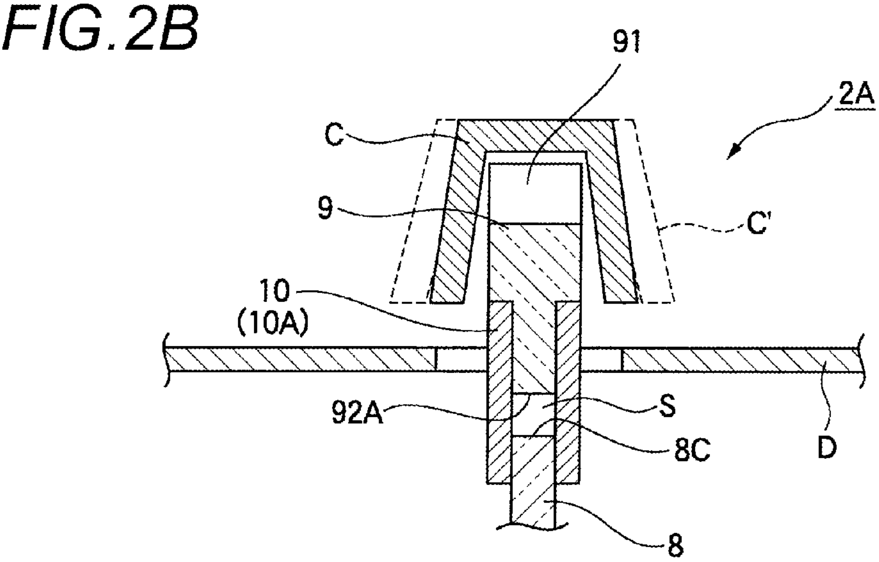
FIG. 2B is a sectional view taken on arrow line IIB-IIB of FIG. 2A.

FIGS. 1 and 2A and 2B show a meter apparatus 1 to which a pointing device 2A of the invention is applied.

The meter apparatus 1 of this embodiment includes a light source 3 mounted on a substrate B, a motor case 4 which is attached to a predetermined place on the substrate B including a region equipped with this light source 3 and provides the inside with components such as a motor 5, a reduction gear train and a rotary shaft 8 described below, and a display plate D which is installed over this motor case 4 and displays necessary information about a vehicle body or ambient environments of a vehicle, for example, numeric characters, characters or symbols.

The meter apparatus 1 of the embodiment constructs a part of the combination meter (not shown). The upper portion of the display plate D forming the front side of the combination meter is provided with a facing plate. Also, various display windows for installing various instruments and the like including the meter apparatus 1 are opened in this facing plate, and the facing plate is integrated with a combination meter case constructing the side surface and rear surface sides. Further, the top of this facing plate is covered with a transparent cover glass (not shown) of a black color system etc.

In addition, the meter apparatus 1 of the embodiment constructs a speedometer, and displays the present speed in an analog manner by turning a pointer 9 described below by a predetermined angle and indicating a specific numeric character formed on the display plate D based on a sensor signal corresponding to the present speed detected by a sensor (not shown).

The light source 3 of the embodiment is configured by, for example, an LED (Light Emitting Diode) for emitting visible light of a predetermined wavelength (λ), and is mounted on the substrate B just under the rotary shaft 8 as opposed to an end face of a proximal end (hereinafter called a "lower end") of the rotary shaft 8 described below. In addition, in the LED which is the light source 3 of the embodiment, the optical axis is set in a Z direction perpendicular to an upper surface of the substrate B and most of the main light (hereinafter called "illuminating light") from this LED is emitted toward an end face 8D of the lower end of the rotary shaft 8 just over the LED.

The motor case 4 is configured by a lower case 4A secured to the substrate B and an upper case 4B fitted into this lower case 4A. A portion of the lower case may extend into an insertion grove P1 formed in the substrate B. Inside of this motor case 4, the motor 5, an intermediate gear 6, and the rotary shaft 8 to which an output gear 7 is formed integrally are provided. A distal end (hereinafter called an "upper end") of the rotary shaft 8 partially projecting to the outside of this motor case 4 is pressed in and fitted into an insertion hole of a light blocking member 10A described below.

The lower case 4A has substantially a box shape whose top is opened. Also, the lower case 4A is provided with a fixing pin P1 projecting from a lower surface and cylindrical protrusions (not shown) projecting from both right and left lateral parts toward a lower part (−Z direction), and these pin and protrusions are respectively fitted into each of the fixing holes opened in the substrate B.

Also, in correspondence with a recess 41 formed in the lower surface, a bearing 8A cylindrically projecting toward a direction of the upper case 4B opposite to this recess 41 is formed inside the lower case 4A. Further, a bearing 52B and a bearing 6B slightly cylindrically projecting toward the direction of the upper case 4B are respectively formed on an inner surface of this lower case 4A.

On the other hand, the upper case 4B is provided with a bearing 8B, in the upper side of the rotary shaft 8, cylindrically projecting outward (upward) just over the bearing 8A in correspondence with the bearing 8A formed on the center of the recess 41 of the lower case 4A, and the upper side of the rotary shaft 8 rotatably extends through a shaft hole 45 bored in the center of this bearing 8B. Further, in this upper case 4B, a bearing 52D and a bearing 6C are formed in an inner part (lower part) just over the bearing 52B and the bearing 6B in correspondence with the bearing 52B and the bearing 6B of the lower case 4A.

The motor 5 is means for turning the pointer 9, and is constructed so as to turn the pointer 9 integrated with this rotary shaft 8 along a surface of the display plate D to indicate various items of necessary information by turning the rotary shaft 8 while decelerating through a reduction gear train, that is, the intermediate gear 6 and the output gear 7 (it may be configured to decelerate by a single gear rather than the gear train). The motor 5 of the embodiment includes a stator 51 formed of a proper conductive material, and a rotor 52 attached to a rotor shaft 52A in the opened center of this stator 51, and constructs a step motor.

The rotor 52 is formed of a proper magnetic material in substantially a cylindrical shape and is rotatably installed in the opened center of the stator 51, and a small-diameter rotor gear 53 with a small number of teeth is concentrically secured to the top and also plural magnets 52C are fastened to the outer peripheral surface. In addition, the rotor shaft 52A to which the rotor 52 is attached is rotatably pivoted between the bearing 52B formed on the lower case 4A and the bearing 52D formed on the upper case 4B.

The intermediate gear 6 is fastened to a support shaft 6A, and this support shaft 6A is rotatably supported between the bearing 6B formed on the lower case 4A and the bearing 6C formed on the upper case 4B. In this intermediate gear 6, a main wheel 61 with a large number of teeth formed on the outer periphery meshes with the rotor gear 53 of a pinion fastened to the top of the rotor 52, and a rotational speed from the rotor 52 is decreased and is transmitted. Also, in an upper part of this intermediate gear 6, a small-diameter pinion 62 with a small number of teeth is coaxially fastened integrally to the support shaft 6A.

The output gear 7 is formed integrally to the rotary shaft 8 in the vicinity of the middle of the rotary shaft 8 in order to transmit torque from the pinion 62 of the intermediate gear 6 to the rotary shaft 8. As a result, this output gear 7 may be molded of a proper resin material which has good light guiding properties and is the same material as the rotary shaft 8 described below.

Also, in this output gear 7, a main wheel 71 with a large number of teeth formed on the outer periphery meshes with the pinion 62 formed on the upper part of the intermediate gear 6, so that a rotational speed of the intermediate gear 6 is further decreased and is transmitted and the output gear 7 rotates. As a result, the rotary shaft 8 formed integrally to this output gear 7 can turn integrally at the same angular speed as that of the output gear 7 decreased greatly.

The rotary shaft 8 is formed of a proper translucent resin material with good light guiding properties and has substantially a columnar shape attached integrally to the output gear 7. Also, the upper end side of this rotary shaft 8 projects from the shaft hole 45 of the upper case 4B to the outside of the motor case 4 as described above. The upper end side and the lower end side of this rotary shaft 8 are rotatably pivoted to the bearing 8B and the bearing 8A respectively formed on the upper case 4B and the lower case 4A while a pointing shaft 92 of the pointer 9 is assembled integrally to the upper end side of the rotary shaft 8 through the light blocking member 10A.

Also, as described above, this rotary shaft 8 is formed so that the portion of the end face 8D of the lower end is opposed to the light source 3 just over the light source 3, and when illuminating light from the light source 3 enters the portion of this end face 8D, most of this illuminating light is guided while repeating reflection (for example, regular reflection or total reflection) at the interface to an outer peripheral surface of the inside of the rotary shaft 8, and propagates toward the upper end.

The pointer 9 is formed of a proper resin material having light guiding properties. This pointer 9 is constructed so that a deflection surface 91 is formed on a rear surface of the proximal end corresponding to the just upper portion of the rotary shaft 8 and an optical path of the illuminating light guided from the rotary shaft 8 is changed 90° by the deflection surface 91 of the pointer 9 and the illuminating light is guided to the distal end side. Also, an opaque cap C described below in detail is attached to this pointer 9 in a state of covering the deflection surface 91 with the cap C from above.

Figure 3:
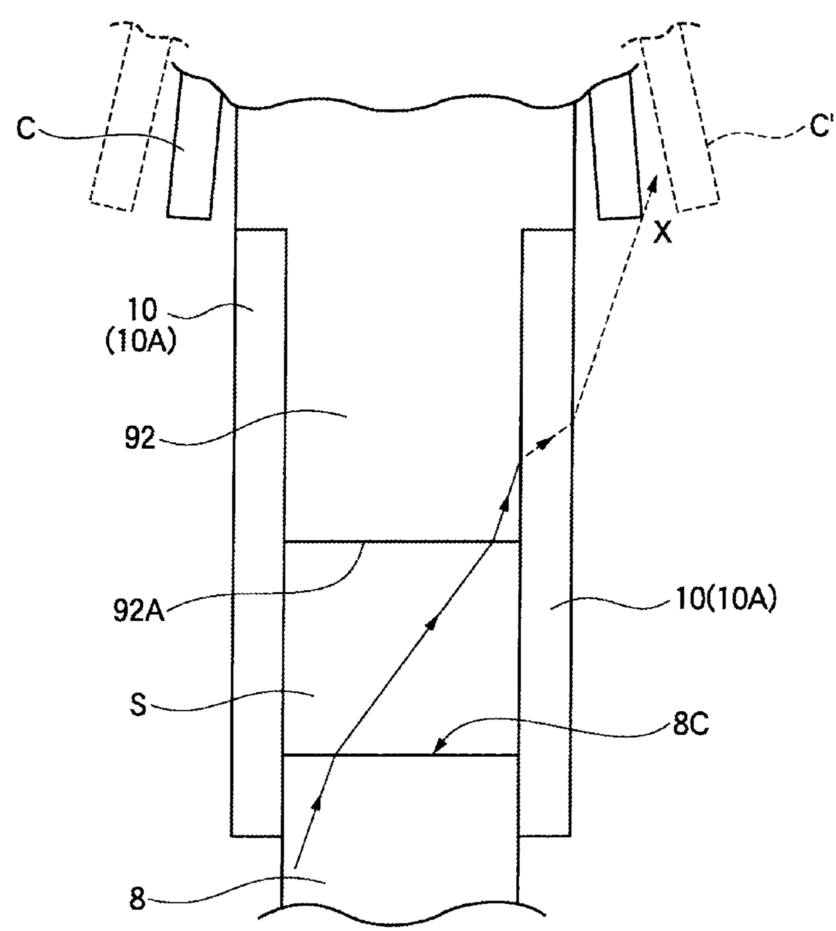
FIG. 3 is an optical path diagram enlarging and showing travel of a part of the illuminating light in a main part in the meter apparatus shown in FIG. 1.

Further, in this pointer 9, the pointing shaft 92 is vertically formed on the proximal end side of a back surface 9A (a lower surface corresponds to this back surface in FIG. 1) as shown in FIGS. 2A and 3. The cylindrical light blocking member 10A into which this pointing shaft 92 is inserted is attached to the pointing shaft 92, and an outer peripheral surface of the pointing shaft 92 is covered with the light blocking member 10A.

This light blocking member 10A is formed of a proper light blocking material. Also, a fitting hole is formed in the center of the light blocking member 10A so as to open both upper and lower ends thereof, and this constructs a main body 10. Then, as described above, the lower end of the pointing shaft 92 is fitted into the main body 10 by pressing the lower end of the pointing shaft 92 in an opening of the upper side of the light blocking member 10A and also, the upper end of the rotary shaft 8 is fitted into the main body 10 by pressing the upper end of the rotary shaft 8 in an opening of the lower side of the light blocking member 10A.

The cap C is used for avoiding a situation in which light from the light source 3 directly enters eyes of a visual recognition person. Even when illuminating light entering the pointer 9 passes through the upper portion of the pointer 9 as it is and enters the cap C of the top, the cap C absorbs the light and thereby, the light is prevented from traveling to the outside of the cap C of the top directly. In addition, it is constructed so that most of the illuminating light entering the pointer 9 from the rotary shaft 8 reaches a proximal end surface (hereinafter called a "lower surface 92A") of the pointing shaft 92 and efficiently enters the pointer 9 without being absorbed by the light blocking member 10A. Further, the optical path of the illuminating light entering the lower surface 92A of this pointing shaft 92 is changed at 90° by the deflection surface 91, so that the light hardly enters the cap C and can efficiently travel toward a distal end direction of the pointer 9.

Next, operations of the embodiment including a general operation as the meter apparatus 1, that is, a display operation by the pointer 9 will be described. In addition, in description of the meter apparatus 1 herein, a speedometer of the meter apparatuses and the like is taken as an example and an operation of the speedometer is described, but the meter apparatuses are not particularly limited to this speedometer. Also, the operation herein is similar to that in the case of other analog type meter apparatus.

Based on a sensor signal corresponding to the present speed detected by a sensor (not shown), the motor 5 constructing the step motor formed inside the motor case 4 of the meter apparatus 1 is rotated and driven, and the pointer 9 is turned by a predetermined angle, and a specific numeric character formed on the display plate D is indicated. That is, in the meter apparatus 1 of the embodiment, the sensor signal corresponding to the speed detected by the sensor (not shown) flows through a coil of the side of the stator 51 shown in FIG. 1 and thereby, a magnetic force is generated in a magnetic core forming each magnetic pole and the rotor 52 is rotated by this magnetic force.

Consequently, as shown in FIGS. 2A and 2B, torque is decelerated and is transmitted from the rotor gear 53 integrated with the rotor 52 from the main wheel 61 of the intermediate gear 6, and the intermediate gear 6 and the support shaft 6A for pivoting this intermediate gear 6 are rotated at a predetermined angular speed. Then, the torque is further decelerated and is transmitted from the pinion 62 of the rotated intermediate gear 6 to the output gear 7 and the rotary shaft 8, and the output gear 7 and the rotary shaft 8 integrated with this output gear 7 are rotated at a predetermined angular speed. Accordingly, the pointer 9 attached to the upper end of the rotary shaft 8 through the light blocking member 10A is turned by a predetermined angle, and a specific numeric character on the display plate D is indicated by the distal end of a pointer of the pointer 9. Consequently, a driver etc. can be informed of the present speed by analog display.

Next, a propagation operation etc. of the illuminating light from the light source 3 inside the rotary shaft 8 and the pointer 9 will be described.

In the meter apparatus 1 for displaying the speed as described above, the illuminating light emitted from the light source 3 enters an entrance plane which is the end face 8D of the lower end of the rotary shaft 8 arranged in the just upper portion of the light source 3 as shown in FIG. 1. Then, most of the illuminating light entering the inside of the rotary shaft 8 from this entrance plane travels toward the upper portion of the inside of the rotary shaft 8 while repeating reflection at the interface to an outer peripheral surface of the inside of the rotary shaft 8. In addition, even when the rotary shaft 8 is turning, propagation action of the illuminating light inside this rotary shaft 8 is naturally performed in a manner similar to the case of a static state except that the optical path upward rotates in a spiral manner.

Most of the illuminating light passing through the inside of the rotary shaft 8 is refracted on an upper surface 8C of the rotary shaft 8 at a predetermined refraction angle and is emitted to an air layer S, and most of the illuminating light from the light source 3 entering this air layer S passes through the air layer S as it is, and enters the lower surface 92A of the pointing shaft 92. Of course, depending on the traveling optical path, some illuminating light from the light source 3 entering the air layer S enters the light blocking member 10A and is absorbed by the light blocking member 10A.

Hence, a direction incident on the end face 8D of the lower end of the rotary shaft 8 from the light source 3 is preferably made parallel to a direction of a shaft line (Z) of the rotary shaft 8 where possible. Because of this, for example, when there is spatially room for installation space, preferably, a collimator, a ball lens, etc. are arranged between the light source 3 and the end face 8D, or the end face 8D of the rotary shaft 8 is processed in a convex spherical surface.

According to the embodiment, the illuminating light from the light source 3 enters the rotary shaft 8 and passes through the inside of this rotary shaft 8. Then, most of the light travels in the air layer S and enters the pointing shaft 92. Also, some illuminating light enters the light blocking member 10A after traveling from the upper surface 8C of the rotary shaft 8 to the air layer S, but this light is absorbed by the light blocking member 10A, so that the light does not leak to the outside while the light travels in the air layer S. Furthermore, the light blocking member 10A is externally fitted into the pointing shaft 92 so as to cover the outer peripheral surface over the whole length as shown in FIGS. 2A and 2B, so that the illuminating light after entering the pointing shaft 92 is also prevented from leaking from this pointing shaft 92 to the outside.

Further, the illuminating light entering the lower surface 92A of the pointing shaft 92 effectively propagates to the inside of the pointer 9 and the proximal end portion of the pointer 9 is covered with the cap C, so that a situation in which the light leaks from a lower surface of the proximal end portion of the pointer 9 and intense halation is caused in the vicinity of the lower surface is also avoided. Also, an upper portion and a side surface of the proximal end portion of the pointer 9 are covered with the cap C, so that the light does not leak from these portions.

Also particularly, according to the embodiment, as shown in FIG. 3, the illuminating light is absorbed by the light blocking member 10A and is prevented from leaking from the pointing shaft 92 to the outside, so that it is unnecessary to form the cap C like a conventional large-sized cap C'. In other words, even in the case of using the small cap C, there is no fear that the illuminating light leaks from the lower part of a skirt of the cap C to the outside. According to the embodiment thus, even when the cap C is miniaturized, the light from the light source 3 can be prevented from leaking, so that a situation in which the illuminating light leaks from the proximal end side of the pointer 9 and halation is caused can be prevented.

Therefore, according to the embodiment, the situation in which the illuminating light passing through the rotary shaft 8 from the light source 3 leaks and halation is caused does not occur, and the pointer can efficiently become luminous.

In addition, the case of a state in which a gap as the air layer S is formed between the rotary shaft 8 and the pointing shaft 92 vertically formed on the proximal end portion of the pointer 9 has been described herein, but in the case of maximizing the amount of pressing the upper end of the rotary shaft 8 in the light blocking member 10A, there are cases where the air layer S is not formed. Even in this case, the light blocking member 10A can similarly prevent the illuminating light from the light source 3 from leaking from the lower portion of the proximal end portion of the pointer 9, so that the situation in which the illuminating light leaks from the lower portion of the proximal end side of the pointer 9 and halation is caused does not occur. Such configuration and effect also apply to each of the following embodiments.

Second Embodiment

Next, a second embodiment according to the invention will be described in detail with reference to the drawings. In addition, in the present embodiment, overlap description is omitted by assigning the same numerals to the same portions as those of the first embodiment.

Figure 4A:
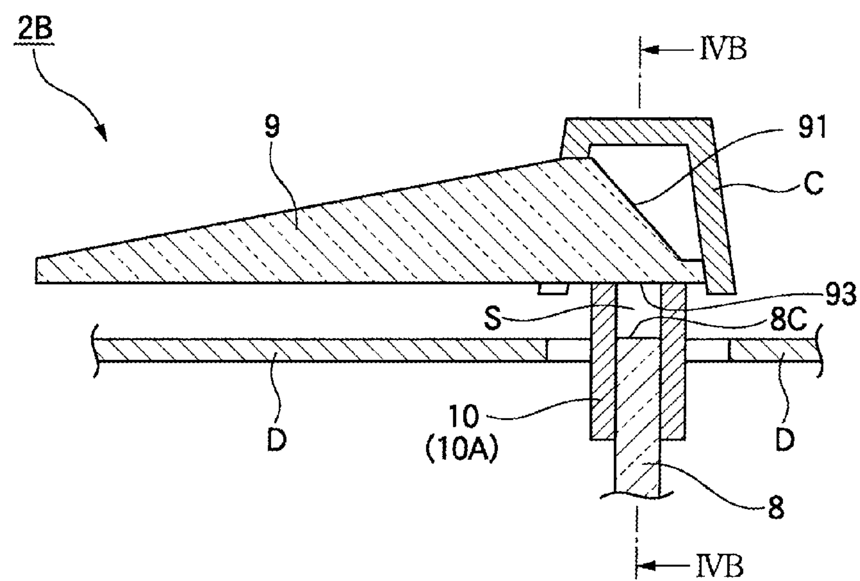
FIG. 4A is a sectional view showing a main part of a pointing device included in a meter apparatus according to a second embodiment.
Figure 4B:
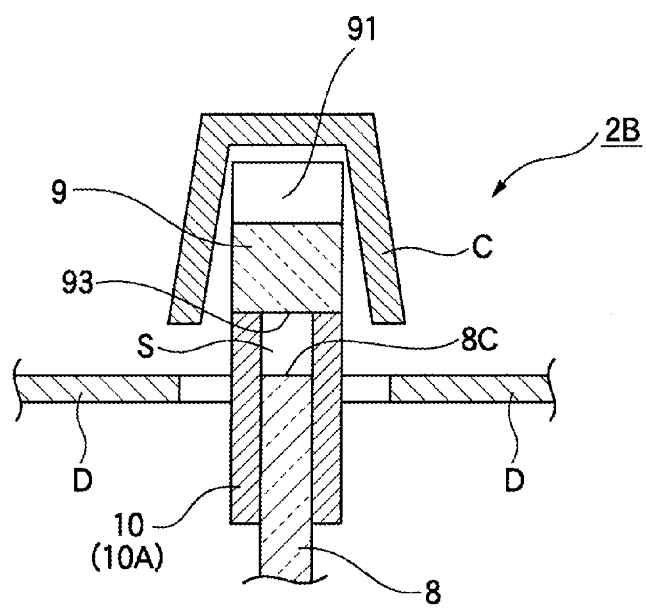
FIG. 4B is a sectional view taken on arrow line IVB-IVB of FIG. 4A.

FIGS. 4A and 4B show a main part of a meter apparatus to which a pointing device 2B according to the second embodiment of the invention is applied, and the pointing device 2B included in this meter apparatus differs from the pointing device 2A of the first embodiment in that a pointer 9 is not provided with a pointing shaft and one open end face of a light blocking member 10A is directly fixed to a bottom surface 93 of the proximal end portion of the pointer 9 since the pointing shaft is absent.

Next, a travel operation of illuminating light in the present embodiment will be described.

The illuminating light from a light source of the meter apparatus enters a rotary shaft 8 and passes through the inside of the rotary shaft 8 and then, most of the light travels in an air layer S and enters the bottom surface 93 of the proximal end portion of the pointer 9. Also, like the first embodiment, some illuminating light enters the light blocking member 10A after traveling from an upper surface 8C of the rotary shaft 8 to the air layer S, but the illuminating light in that case is absorbed by the light blocking member 10A, so that the light does not leak from the air layer S to the outside.

Furthermore, the illuminating light entering the bottom surface 93 of the pointer 9 after traveling in the air layer S of the inside of an insertion hole of the light blocking member 10A is effectively prevented from leaking from the proximal end side of this pointer 9 to the outside since the whole surface excluding the bottom surface 93 in the proximal end side of the pointer 9 is covered with a cap C. Therefore, halation due to a light leak can be inhibited from occurring in the vicinity of this proximal end side of the pointer 9.

Also, according to the embodiment, the pointing shaft is not inserted into the light blocking member 10A, so that, for example, it becomes unnecessary to design and manufacture an outside diameter of the pointing shaft according to an inside diameter of the light blocking member 10A.

Third Embodiment

Next, a third embodiment according to the invention will be described in detail with reference to the drawings. In addition, in the present embodiment, overlap description is omitted by assigning the same numerals to the same portions as those of the first embodiment.

Figure 5A:
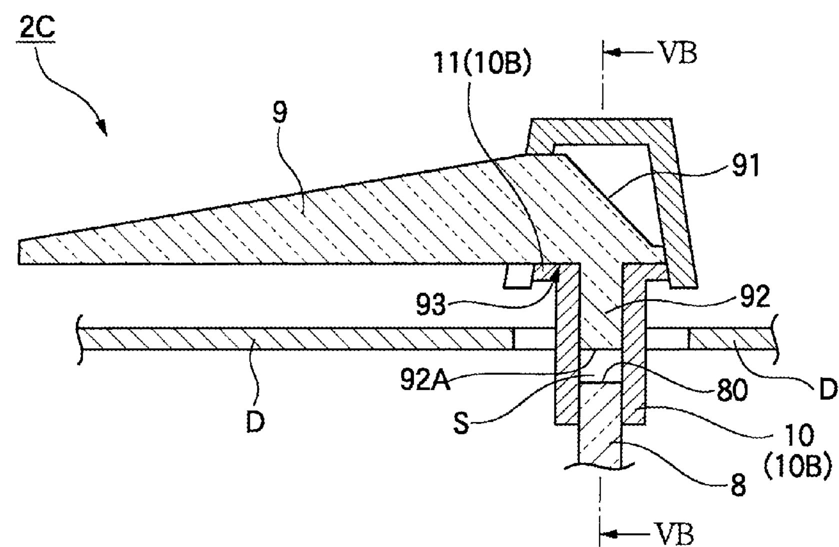
FIG. 5A is a sectional view showing a main part of a pointing device included in a meter apparatus according to a third embodiment.
Figure 5B:
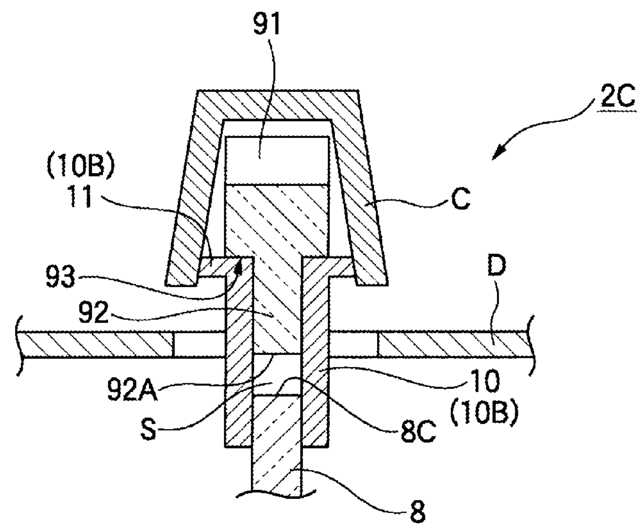
FIG. 5B is a sectional view taken on arrow line VB-VB of FIG. 5A.

FIGS. 5A and 5B show a main part of a meter apparatus to which a pointing device 2C according to the third embodiment of the invention is applied, and the pointing device 2C included in this meter apparatus differs from the pointing device 2A of the first embodiment in a shape of a light blocking member.

In a light blocking member 10B of the pointing device 2C, an upper part of a main body 10 having substantially a cylindrical shape is provided with a bottom surface part 11 (flange portion) having a rectangular flange shape projecting toward the lateral outside. In the case of inserting a pointing shaft 92 into a fitting hole of the main body 10, the bottom surface part 11 abuts on a bottom surface 93 of the proximal end portion of a pointer 9, or faces the bottom surface 93 at a small distance.

Next, a travel operation of illuminating light in the present embodiment will be described.

The illuminating light from a light source of the meter apparatus enters a rotary shaft 8 and passes through the inside of the rotary shaft 8 and then, most of the light travels in an air layer S and enters the pointing shaft 92. Also, like the first embodiment, some illuminating light enters the light blocking member 10B after traveling from an upper surface 8C of the rotary shaft 8 to the air layer S, but the illuminating light is absorbed by this light blocking member 10B. Therefore, the illuminating light does not leak from the air layer S to the outside.

Furthermore, according to the embodiment, the illuminating light entering a lower surface 92A of the pointing shaft 92 after traveling in the air layer S of the inside of the light blocking member 10B is also prevented from leaking from an outer peripheral surface of the pointing shaft 92 to the outside since the outer peripheral surface of the pointing shaft 92 is covered with the light blocking member 10B. Further, since the bottom surface 93 of the proximal end portion of the pointer 9 is also covered with the bottom surface part 11 of the light blocking member 10B, the illuminating light after passing through the pointing shaft 92 is more prevented from leaking from the bottom surface 93. Moreover, since the whole surface excluding the bottom surface 93 in the proximal end portion of the pointer 9 is covered with a cap C, the illuminating light is also prevented from leaking from the proximal end side of this pointer 9 to the outside. Therefore, halation due to a light leak can completely be inhibited from occurring in the vicinity of this pointing shaft 92.

Fourth Embodiment

Next, a fourth embodiment according to the invention will be described in detail with reference to the drawings. In addition, in the present embodiment, overlap description is omitted by assigning the same numerals to the same portions as those of the first to third embodiments.

Figure 6A:
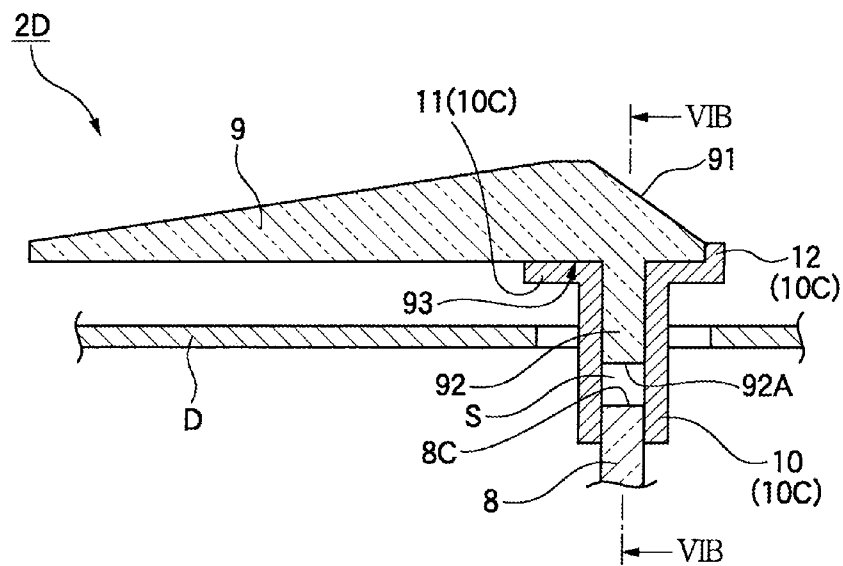
FIG. 6A is a sectional view showing a main part of a pointing device included in a meter apparatus according to a fourth embodiment.
Figure 6B:
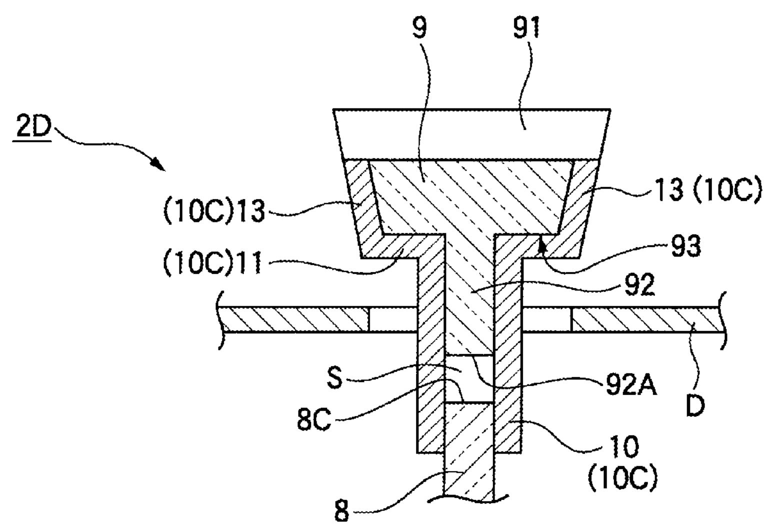
FIG. 6B is a sectional view taken on arrow line VIB-VIB of FIG. 6A.

FIGS. 6A and 6B show a main part of a meter apparatus to which a pointing device 2D according to the fourth embodiment of the invention is applied, and the pointing device 2D included in this meter apparatus differs from the pointing device 2A of the first embodiment to the pointing device 2C of the third embodiment in that a light blocking member 10C has a flange portion which extends to a lower surface over the whole outer peripheral surface excluding a deflection surface 91 of roof surface and rear surface sides of an outer peripheral surface of the proximal end portion of a pointer 9 as well as an outer peripheral surface of a pointing shaft 92. Also, the pointing device 2D to which this light blocking member 10C is attached differs from the pointing device 2A of the first embodiment to the pointing device 2C of the third embodiment in that the cap C included in the pointing devices 2A to 2C is not attached to the pointing device 2D.

Figure 7:
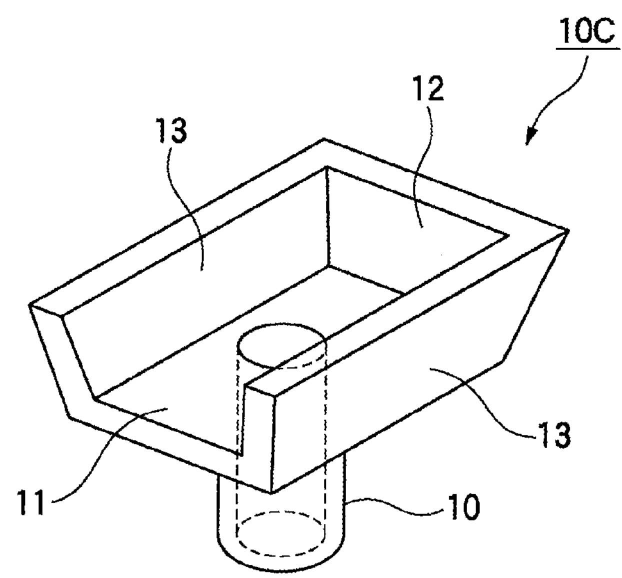
FIG. 7 is a perspective view showing a light blocking member included in the pointing device shown in FIGS. 6A and 6B.

The light blocking member 10C has the flange portion having a shape in which a box shape opened to the upper side is attached to a cylindrical lower side using a proper opaque material as shown in FIG. 7. That is, the light blocking member 10C of the embodiment concretely includes a cylindrical main body 10 into which the pointing shaft 92 is inserted so as to cover the outer peripheral surface of the pointing shaft 92, a bottom surface part 11 with which a bottom surface 93 of the proximal end side of the pointer 9, namely a bottom surface portion in the periphery of the pointing shaft 92 is covered, a rear surface part 12 (flange portion) with which an erect surface vertically erected from the bottom surface in the rear surface side of the pointer 9 is covered, and side surface parts 13 (flange portion) with which about the lower halves of side wall surfaces of the pointer 9 are covered.

Thus, the flange portion of the light blocking member 10C of the embodiment is constructed so as to cover about the lower half of the outer peripheral surface of the proximal end side of the pointer 9 and the pointing shaft 92 with the light blocking member 10C having a peculiar shape. As a result, the illuminating light from a light source does not leak from the outer peripheral surface of the pointing shaft 92 and the outer peripheral surface of the lower half of the proximal end side of the pointer 9. Consequently, occurrence of halation due to a light leak from these portions can be avoided, so that the need for the cap is also eliminated.

Fifth Embodiment

Next, a fifth embodiment according to the invention will be described in detail with reference to the drawings. In addition, in this embodiment, overlap description is omitted by assigning the same numerals to the same portions as those of the first to fourth embodiments.

Figure 8A:
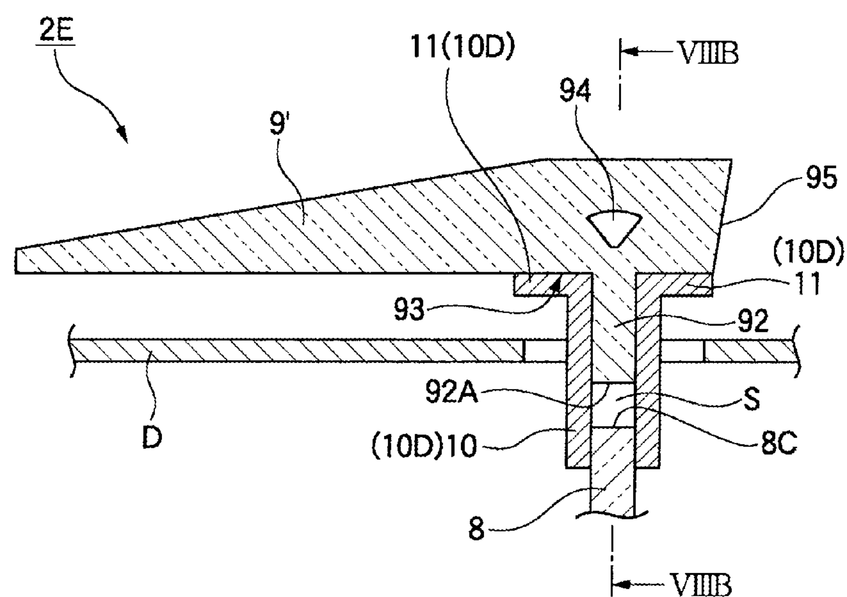
FIG. 8A is a sectional view showing a main part of a pointing device included in a meter apparatus according to a fifth embodiment.
Figure 8B:
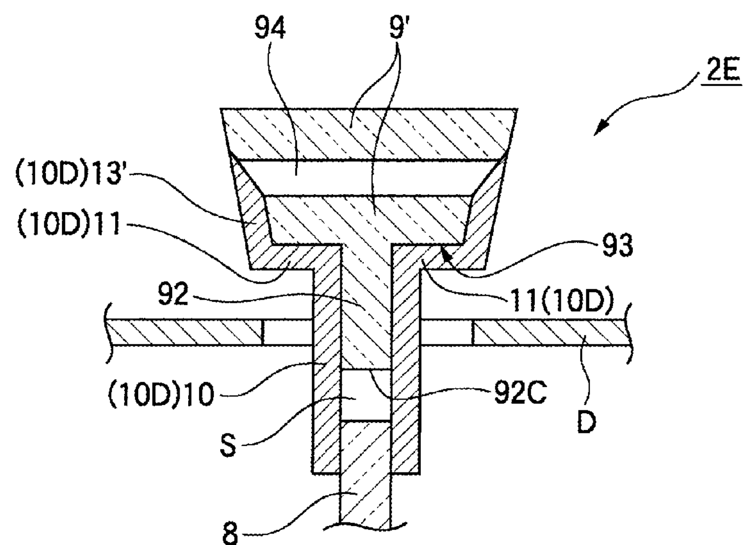
FIG. 8B is a sectional view taken on arrow line VIIIB-VIIIB of FIG. 8A.

FIGS. 8A and 8B show a main part of a meter apparatus to which a pointing device 2E according to the fifth embodiment of the invention is applied, and the pointing device 2E included in this meter apparatus differs from the pointing device 2A of the first embodiment to the pointing device 2D of the fourth embodiment in that a shape of a light blocking member 10D differs from shapes of the light blocking members 10A to 10C of the first to third embodiments and a pointer 9' has a void 94. Also, a configuration of the fifth embodiment is similar to that of the fourth embodiment in that a cap is not attached to the pointing device 2E.

Further, unlike the deflection surfaces 91 of the pointers 9 of the first to fourth embodiments, a rear surface of the proximal end side in the pointer 9' of this embodiment has a deflection surface 95 inclined downward, in other words, in a direction opposite to the visual recognition person side.

That is, this light blocking member 10D is formed in a shape in which an upper part with a box shape having wall surfaces in both right and left sides is attached to a cylindrical lower part using a proper opaque material. In other words, the light blocking member 10D has a flange which extends to a lower surface over the whole lower half of an outer peripheral surface excluding a deflection surface 95 of a rear surface and a roof surface of an outer peripheral surface of the proximal end portion of a pointer 9'.

The light blocking member 10D of the embodiment includes a cylindrical main body 10 into which the whole pointing shaft 92 and an upper part of a rotary shaft 8 are inserted, a substantially rectangular bottom surface part 11 with which a bottom surface 93 of the periphery of the pointing shaft 92 in the proximal end side of the pointer 9' is covered, and side surface parts 13' (flange portion), obliquely upward erected in a state of being opened from both side surfaces of this bottom surface part 11, with which about the lower halves of both right and left side wall surfaces of the pointer 9' are covered. That is, this light blocking member 10D has a shape substantially similar to the shape in which the rear surface part 12 is eliminated from the light blocking member 10C of the fourth embodiment.

Further, in the pointer 9' of this pointing device 2E, the pointing device 2E differs from the pointing device 2A of the first embodiment to the pointing device 2D of the fourth embodiment, and the void 94 described above is formed inside the pointer 9' just over an attachment region of the pointing shaft 92.

Figure 9A:
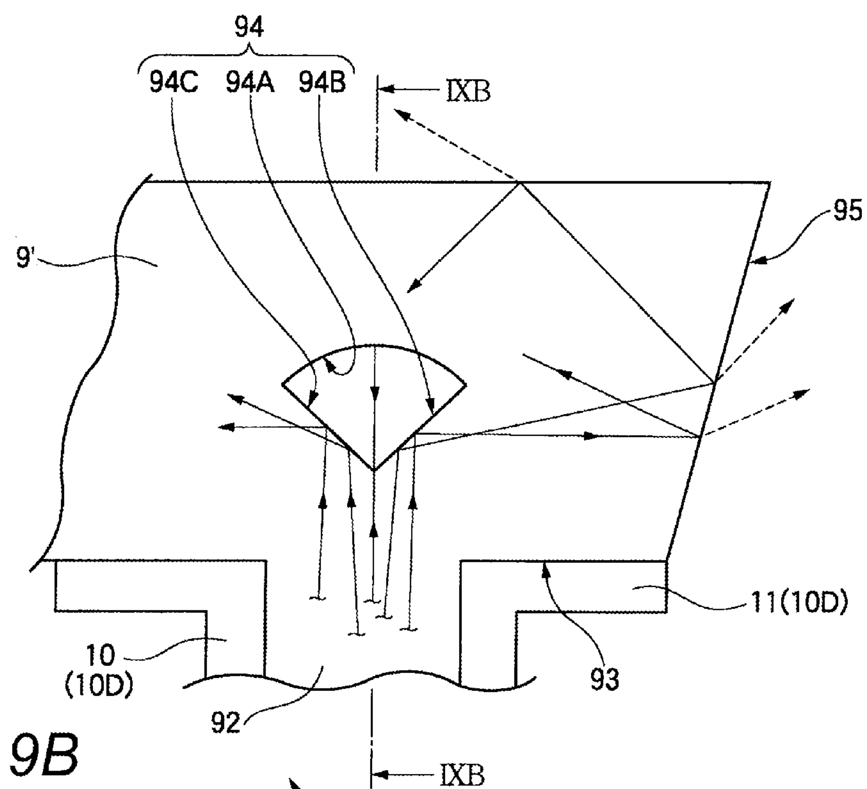
FIG. 9A is an optical path diagram showing a path of illuminating light in a main part of the pointing device shown in FIG. 8A.
Figure 9B:
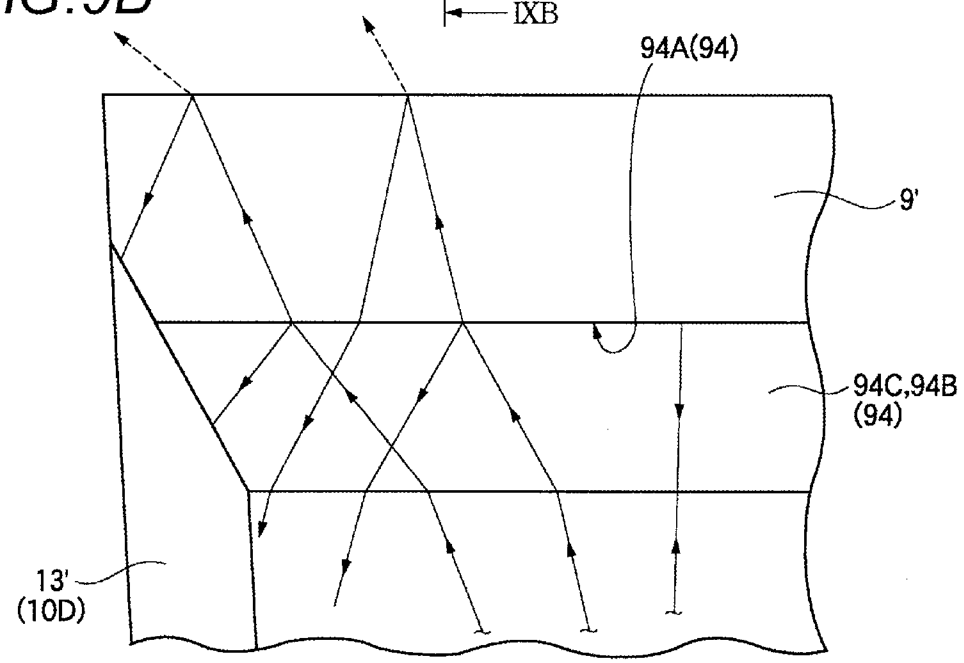
FIG. 9B shows the path of the illuminating light in the main part of the same pointing device and is a sectional view taken on arrow line IXB-IXB in FIG. 9A.

This void 94 is formed over the whole width direction orthogonal to a longitudinal direction of the pointer 9' just over the attachment region of the pointing shaft 92 inside the pointer 9' as shown in FIG. 9A. The void 94 of the embodiment is formed in a substantially sectoral cross section (or an substantially inverted triangular cross section), and includes a concave roof surface 94A downward curved in a dome shape, and inclined surfaces 94B and 94C formed in both right and left sides of this roof surface 94A.

Next, action and effect in this embodiment will be described along a travel operation of illuminating light.

The illuminating light from a light source of the meter apparatus enters the rotary shaft 8 and passes through the inside of the rotary shaft 8 and then, most of the light travels in an air layer S and enters the pointing shaft 92. Also, like the first embodiment, some illuminating light enters the light blocking member 10D while the light travels from an upper surface 8C of the rotary shaft 8 to the air layer S, but the illuminating light is absorbed by the light blocking member 10D, so that the illuminating light does not leak to the outside while the light travels in the air layer S.

Furthermore, the illuminating light after entering a lower surface 92A of the pointing shaft 92 after traveling in the air layer S of the inside of the light blocking member 10D is also prevented from leaking from an outer peripheral surface of the pointing shaft 92 to the outside since the outer peripheral surface of the pointing shaft 92 is covered with the light blocking member 10D. Further, the illuminating light after passing through the pointing shaft 92 is prevented from leaking from the bottom surface 93 of this proximal end side since the bottom surface 93 of the proximal end side of the pointer 9' is also covered with the bottom surface part 11 of the light blocking member 10D as shown by an optical path of the illuminating light in FIG. 9A. Moreover, since the whole surface of the lower half of a side surface excluding a rear surface in the proximal end side of the pointer 9' is covered with the light blocking member 10D, the illuminating light is also prevented from leaking from the lower half of the proximal end side of this pointer 9' to the outside. Therefore, even when the cap is not formed, halation due to a light leak can be inhibited from occurring in the vicinity of this proximal end side of the pointer 9'.

On the other hand, most of the illuminating light traveling just over the pointing shaft 92 of the inside of the pointer 9' is reflected laterally or downwardly by the void 94 formed over the whole width direction of the pointer 9' as shown in FIG. 9A. As a result, even though the cap is not formed, a situation in which the illuminating light passes through the upper portion of the pointer 9' and directly enters eyes of a visual recognition person can effectively be avoided. Also, a situation in which the light leaks from the lower portion of the proximal end side of the pointer 9' to cause halation can naturally be avoided by the light blocking member 10D.

Sixth Embodiment

Next, a sixth embodiment according to the invention will be described in detail with reference to the drawings. In addition, in the present embodiment, overlap description is omitted by assigning the same numerals to the same portions as those of the first to fifth embodiments.

Figure 10A:
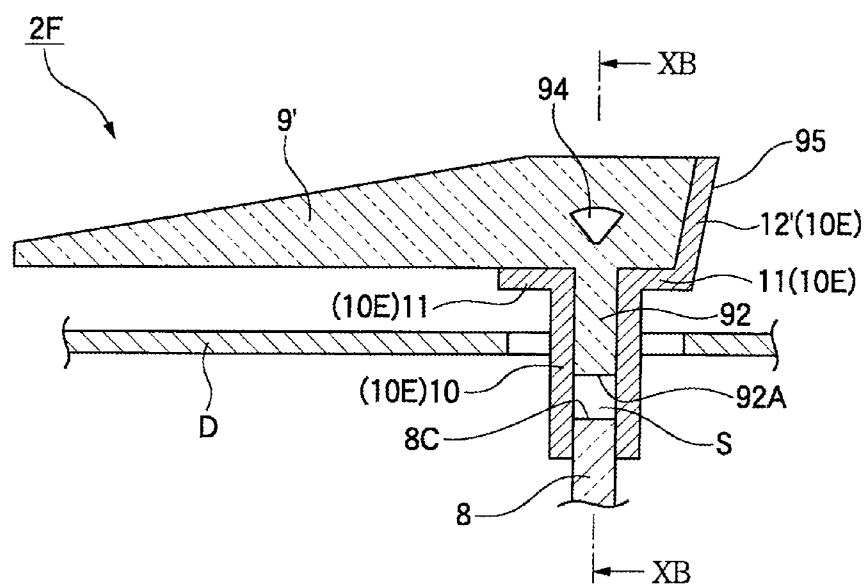
FIG. 10A is a sectional view showing a main part of a pointing device included in a meter apparatus according to a sixth embodiment.
Figure 10B:
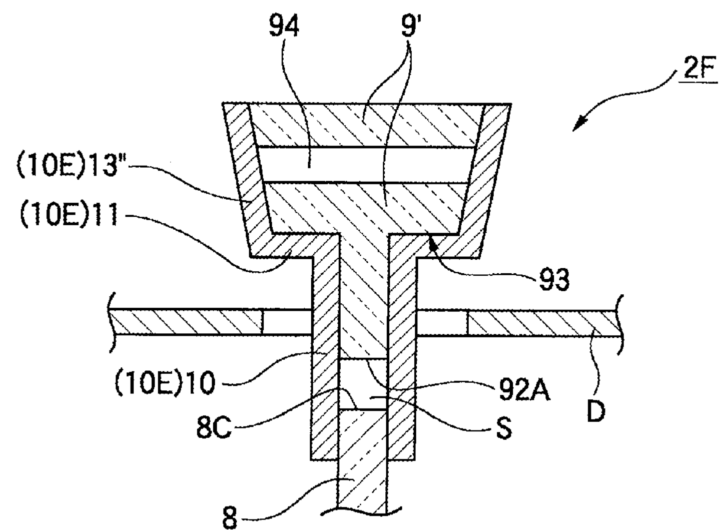
FIG. 10B is a sectional view taken on arrow line XB-XB of FIG. 10A.
Figure 11:
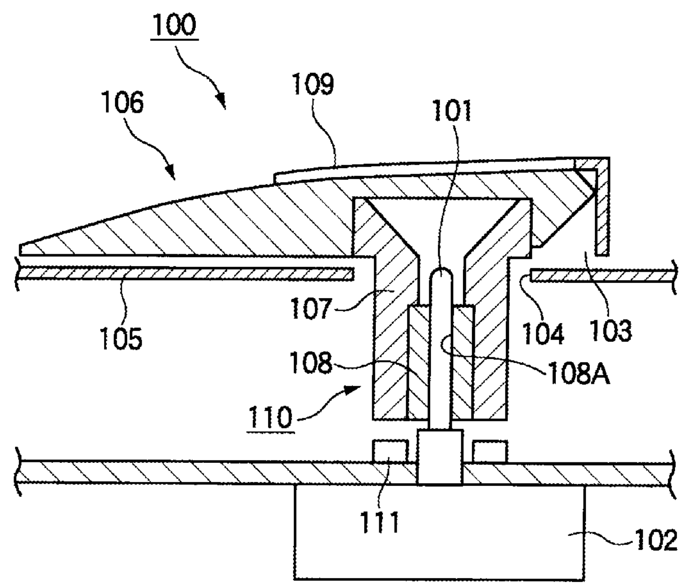
FIG. 11 is a sectional view showing a meter apparatus including a related pointer.
Figure 12:
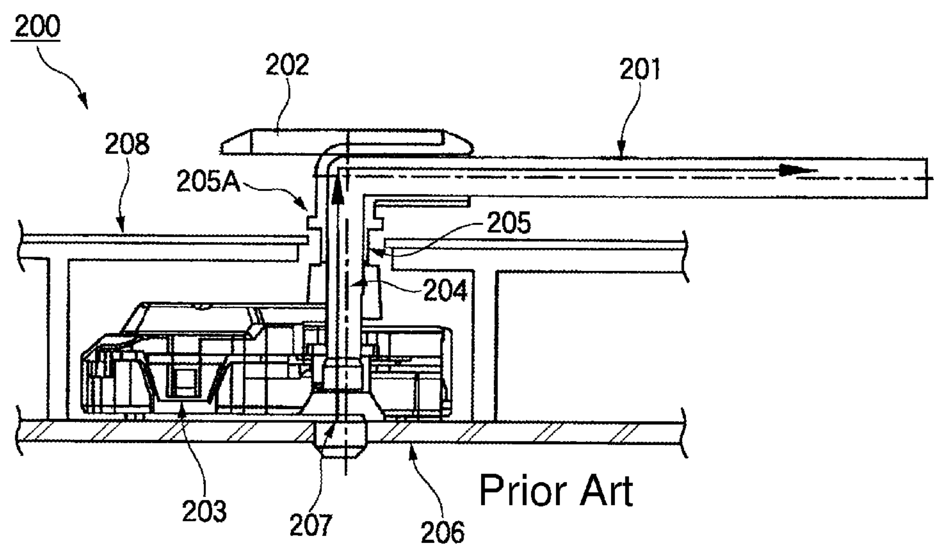
FIG. 12 is a sectional view showing another meter apparatus including another related pointer.

FIGS. 10A and 10B show a main part of a meter apparatus to which a pointing device 2F according to the sixth embodiment of the invention is applied, and the pointing device 2F included in this meter apparatus differs from the pointing device 2E of the fifth embodiment in that a shape of a light blocking member 10E partially differs from that of the light blocking member 10D of the fifth embodiment. Also, a cap is not attached to this pointing device 2F like the pointing device 2E of the fifth embodiment.

Unlike the light blocking member 10D, a rear surface part 12' (flange portion) is formed in the light blocking member 10E so as to cover the whole deflection surface 95 which is a rear surface of the proximal end side of a pointer 9'. By forming such a rear surface part 12', all the illuminating light entering the deflection surface 95 of the proximal end side of the pointer 9' can be absorbed. Therefore, even when a cap is not formed, occurrence of the illuminating light which is reflected at the interface to the outside of the deflection surface 95 and then travels from an upper surface toward a visual recognition person can be avoided, so that the glare on eyes of the visual recognition person can be prevented from being caused.

Therefore, according to the present embodiment, in addition to the light blocking effect of the illuminating light in the fifth embodiment, the illuminating light can be inhibited from being emitted from the deflection surface 95 which is the rear surface of the proximal end side of the pointer 9' to the outside, so that halation due to a light leak in the side of this deflection surface 95 can completely be inhibited from occurring.

In the meter apparatus of each of the embodiments according to the invention, the case of forming a gap which is the air layer S between the upper surface of the rotary shaft 8 and the bottom surface 93 of the proximal end portion of the pointer 9 or the pointing shaft 92 vertically formed on the proximal end portion of the pointer 9 inside the light blocking member has been described above. However, as described in the first embodiment, the air layer S may be constructed so as not to be formed by maximizing the amount of pressing the upper end of the rotary shaft 8 in the light blocking member 10A. Similarly in this case, the illuminating light from the light source can be prevented from leaking from the lower portion etc. of the proximal end portion of the pointer or the pointing shaft by the light blocking member, so that a situation in which the illuminating light leaks from the proximal end side of the pointer to cause halation is prevented.

In addition, the invention is not limited to the embodiments described above, and various forms can be performed without departing from the gist of the invention. That is, the meter apparatus including the rotary shaft to which the pointing device of the invention is applied can be applied to various instruments and the like, for example, a fuel gauge part, a tachometer part, a speedometer part and a water temperature gauge.

By the configuration of the pointing device, a leak of light causing halation can be prevented and also a cap can be miniaturized and a shape of a pointer is not limited to a certain shape. Also, a meter apparatus provided with the pointing device can be obtained.

The invention claimed is:

1. A pointing device, comprising:

a pointer having light guiding properties;

a cap that is attached to the pointer and has light blocking properties;

a pointing shaft that is vertically formed on a proximal end portion of the pointer; and a light blocking member that includes a cylindrical main body having both end portions for inserting the pointing shaft and a rotary shaft of a motor having light guiding properties respectively thereinto to prevent illuminating light propagating through the rotary shaft from a light source and entering the pointing shaft from leaking from an outer peripheral surface of the pointing shaft, wherein the light blocking member covers an outer peripheral surface of the pointing shaft over the whole length of the pointing shaft, and wherein an upper portion of the light blocking member tapers around the pointer.

2. The pointing device according to claim 1, wherein the light blocking member includes a flange portion which is extended from the main body and covers a bottom surface of the proximal end portion of the pointer, the bottom surface of the proximal end portion being positioned inside the cap.

3. The pointing device according to claim 2, wherein the proximal end portion of the pointer has as an outer peripheral surface, the bottom surface, a roof surface, a deflection surface positioned in a rear surface of the pointer, a side wall surface vertically erected from the bottom surface in a side surface of the pointer, and an erect surface vertically erected from the bottom surface in the rear surface of the pointer; and wherein the flange portion of the light blocking member is extended from the main body and covers a part of the bottom surface of the outer peripheral surface of the proximal end portion of the pointer.

4. The pointing device according to claim 3, wherein the flange portion of the light blocking member is extended from the main body and further covers a part of the side wall surface or the erect surface of the outer peripheral surface of the proximal end portion of the pointer.

5. The pointing device according to claim 1, wherein in the proximal end portion of the pointer, a void having a substantially inverted triangular shape or a substantially sectoral shape in cross section is formed along a width direction orthogonal to a longitudinal direction of the pointer so as to pass through above the pointing shaft.

6. The pointing device according to claim 5, wherein the upper portion of the light blocking member tapers coinciding with the void.

7. A meter apparatus, comprising:

a rotary shaft having light guiding properties, a light source that is provided on a substrate on which a motor case is mounted, and emits light for illuminating a pointer through the rotary shaft, wherein the rotary shaft is contained in the motor case; and a pointing device according to claim 1, wherein the rotary shaft is assembled to the pointing device by inserting a distal end of the rotary shaft into the cylindrical main body of the light blocking member of the pointing device.

8. The pointing device according to claim 1, wherein the pointer expands between the upper portion of the light blocking member in relation to an amount of the tapering.

9. The pointing device according to claim 1, wherein a rate of expansion of the pointer increases between upper portion of the light blocking member in relation to an amount of the tapering.

* * * * *